April 6, 1965   D. D. BROWN   3,177,015
PIPE COUPLING OF SPONGE ELASTOMER
Filed Jan. 24, 1962

*INVENTOR:*
DELMONT D. BROWN
BY
ATT'YS

United States Patent Office 3,177,015
Patented Apr. 6, 1965

3,177,015
PIPE COUPLING OF SPONGE ELASTOMER
Delmont D. Brown, North Baltimore, Ohio, assignor to
The D. S. Brown Company, North Baltimore, Ohio, a
corporation of Ohio
Filed Jan. 24, 1962, Ser. No. 168,453
2 Claims. (Cl. 285—236)

This invention relates to a pipe coupling and to a method for the manufacture thereof.

One of the objects of the invention is to provide a new and improved pipe coupling which is simple and inexpensive to manufacture and is long lasting.

Another object of the invention is to provide a new and improved pipe coupling which is easy to install.

Other objects and advantages of the invention will be apparent by reference to the following description in conjunction with the accompanying drawings in which—

In accordance with the invention, a pipe coupling is provided which comprises an annular piece of resilient sponge elastomer shaped to form opposed openings into which opposing pipe ends are adapted to fit and engage the interior sides of said openings, and an annular rib integrally formed at an intermediate position between said openings and extending radially inwardly a distance not substantially greater than the wall thickness of said pipe ends. A further feature of the invention is the provision of a structure in which the interior sides of said openings are inclined upwardly from each opening to the base of said annular rib. Another feature of the invention is the provision of an annular internal cavity within said annular piece and at least partially within said rib to permit lateral compression by said pipe ends. A further feature of the invention is the provision of an annular recess in the exterior of said annular piece adapted to receive a locking band or clamp.

Figure 3:
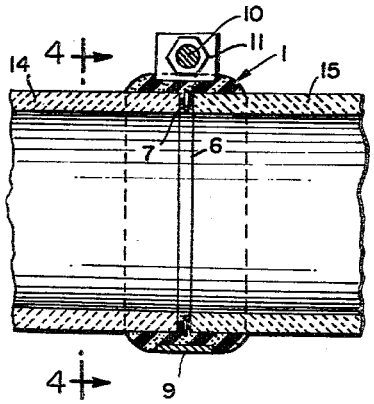
FIGURE 3 is a cross sectional view showing the pipe coupling of FIGURE 1 in assembled relationship with a pair of pipes or conduits.
Figure 4:
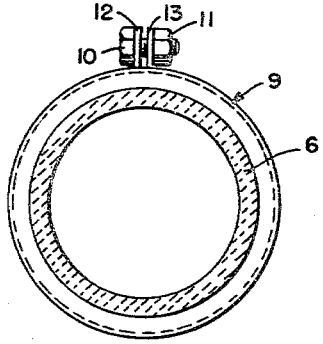
FIGURE 4 is an end view of the assembly taken along the line 4—4 of FIGURE 3.

In the drawings the pipe coupling shown consists of an annular piece of resilient sponge elastomer 1 which is shaped to form opposing openings 2 and 3 having interior surfaces 4 and 5 which are inclined upwardly from said openings to the base of an annular rib 6. An annular internal cavity 7 is formed within the pipe coupling so that at least a part of the cavity extends within the annular rib 6. A recessed portion 8 is also formed on the exterior surface of the coupling to receive a clamping band 9 which is held in place in any suitable manner, for example, by means of a bolt 10 and a nut 11, as shown in FIGURES 3 and 4. The bolt 10 is inserted through opposing upwardly extending flanges 12 and 13 formed on opposite ends of the clamping band 9.

As shown in FIGURE 3, when opposing pipe ends 14 and 15 are inserted into the pipe coupling 1, the inclined surfaces 4 and 5 are pushed upwardly to a substantially horizontal position and exert gripping pressure on the exterior surfaces of the pipe due to their inherent resilience and the fact that they are displaced from their normal positions. The internal cavity 7 provides compensation for the stresses placed on the pipe coupling when the pipe ends are inserted.

In clamping the pipe coupling, it is sometimes desirable to insert a washer or other suitable stop, not shown, in the space between the flanges 12 and 13 to prevent overcompression of the sponge when the clamp is tightened.

It is important for the purpose of the invention that the pipe coupling be made from a resilient sponge elastomer. Sponge elastomers are well known but are not ordinarily employed in pipe couplings. By the term "sponge elastomer" is meant an elastomer in which cells or internal cavities have been formed throughout the elastomer by homogeneously incorporating with the elastomer a blowing agent which evolves a gas or vapor. Open cell sponge elastomers can be used but closed cell sponge elastomers are preferred. Examples of suitable elastomers are rubber, synthetic rubber, neoprene, polyurethanes, and other polymerization products as defined in Hackh's Chemical Dictionary, third edition, page 295. The use of neoprene is preferred for the practice of this invention because of its physical properties and especially because of ageing and weathering properties, its resistance to deterioration by oils, and its resistance to deterioration by substances normally carried in pipe lines. Examples of suitable blowing agents are diazoaminobenzene, urea, biuret, mixtures of urea and biuret and dinitrosopentamethylenetetramine.

Figure 1:
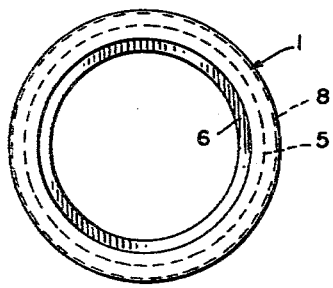
FIGURE 1 is an elevational view of a pipe coupling embodying the invention.
Figure 2:
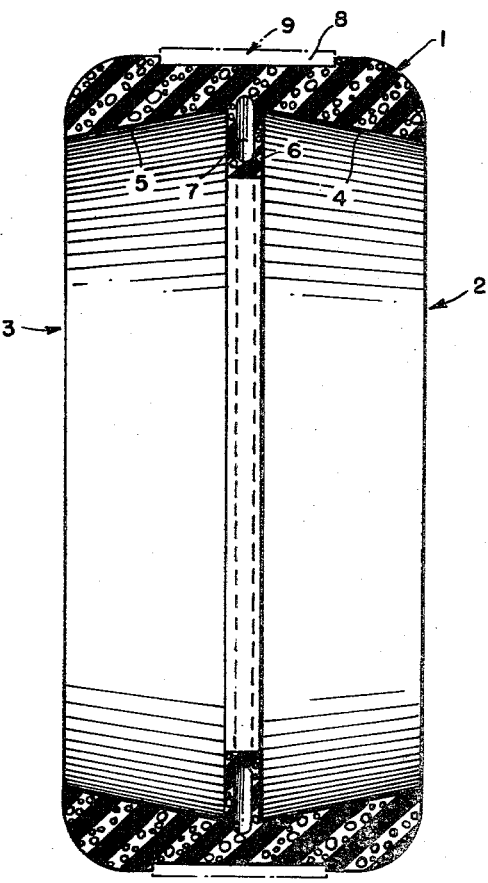
FIGURE 2 is a cross sectional view on an enlarged scale of the pipe coupling shown in FIGURE 1.

The preparation of the sponge elastomeric material is carried out in a conventional manner by mixing the elastomer with the blowing agent and other conventional ingredients, such as waxes, carbon black, process oils, activators for the blowing agent, if required, and antioxidants, at a temperature below the temperature at which the blowing agent evolves the desired gases and/or vapors, then extruding the mixture to shape and applying heat to produce a sponge elastomer. In carrying out the invention it is preferable to extrude the mixture in a continuous piece or strip, cut the strip into smaller pieces and then cement the ends of the cut pieces together to form an annular pipe coupling as shown in FIGURES 1 and 2. It is also possible to mold the pipe coupling in dies in its final form thereby avoiding the cementing operation but the molding process is more expensive due to the cost of the molds, the labor involved and the slower rate of production.

When it is desired to make the pipe coupling with an open cell structure, a sheet of elastomer, e.g., rubber or neoprene, is placed in a mold of the desired shape, particles of expandable sponge elastomer are added and then expanded. Alternatively, a foaming elastomer is injected or squirted into a mold containing a skin or outer layer of elastomer. Another alternative is to extrude an open cell sponge and dip the extruded piece into a solution of a sealing composition such as solvent dispersed rubber or neoprene or polyurethane. Instead of dipping, the piece can be sprayed with a polyurethane solution containing a catalyst to form a skin over the cell structure.

The invention makes it possible to provide a new and improved pipe coupling made from a material of the same type which has heretofore been used in many other applications, such as, sealing the doors and trunks of automobiles, but has not heretofore been employed in pipe couplings. The invention also provides a new and improved method for making such pipe couplings.

The invention is hereby claimed as follows:

1. A pipe and coupling assembly comprising a hollow, cellular-elastomer coupling ring having normally frusto-conical, inner walls tapering from an axially central portion of said coupling ring to opposite ends thereof, said central portion including a cellular-elastomer, annular rib projecting into the central portion of said coupling ring, a cylindrical pipe mounted in each of said opposite ends of said coupling with the outer walls of said pipes deforming said normally frusto-conical inner walls into cylindrical inner walls, said annular rib projecting into said coupling ring a distance not substantially greater than the wall thickness of said pipes, said central portion having an enclosed, annular cavity with the outer, radial wall of said cavity located radially outwardly of the inner wall of said central portion and the inner, radial wall located inside said rib for compensating stresses in said coupling ring when said pipe ends are inserted in said coupling ring, and a ring clamp extending about the outer wall of said central portion opposite said rib and clamping said pipe and coupling assembly.

2. A pipe coupling adapted to coupling opposing ends of pipes and comprising a hollow, cellular-elastomer, coupling ring having normally frusto-conical, inner walls tapering from an axially central portion of said coupling ring to opposite ends thereof, said central portion including a cellular-elastomer, annular rib projecting into the central portion of said coupling ring, and said central portion having an enclosed, annular cavity with the outer, radial wall of said cavity located radially outwardly of the inner wall of said central portion and the inner, radial wall located in said rib for compensating stresses in said coupling ring when pipe ends are inserted in said coupling ring.

References Cited in the file of this patent
UNITED STATES PATENTS

| | | |
|---|---|---|
| 210,906 | Bodart | Dec. 17, 1878 |
| 1,548,361 | Grennor | Aug. 4, 1925 |
| 1,693,636 | Coe | Dec. 4, 1928 |
| 2,184,376 | Beyer et al. | Dec. 26, 1939 |
| 2,403,364 | Hertzell et al. | July 2, 1946 |
| 2,522,684 | Mitchell | Sept. 19, 1950 |
| 2,647,778 | Shields | Aug. 4, 1953 |
| 2,696,994 | Spence | Dec. 14, 1954 |
| 2,828,986 | Mahoff et al. | Apr. 1, 1958 |